(12) United States Patent
Ishii et al.

(10) Patent No.: US 9,916,513 B2
(45) Date of Patent: Mar. 13, 2018

(54) METHOD FOR PROCESSING IMAGE AND COMPUTER-READABLE NON-TRANSITORY RECORDING MEDIUM STORING PROGRAM

(71) Applicant: Panasonic Intellectual Property Corporation of America, Torrance, CA (US)

(72) Inventors: Yasunori Ishii, Osaka (JP); Yukie Shoda, Osaka (JP); Masaki Takahashi, Osaka (JP); Reiko Hagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 18 days.

(21) Appl. No.: 15/345,434

(22) Filed: Nov. 7, 2016

(65) Prior Publication Data

US 2017/0147892 A1    May 25, 2017

(30) Foreign Application Priority Data

Nov. 20, 2015  (JP) .................................. 2015-228205

(51) Int. Cl.
*G06K 9/00* (2006.01)
*G06K 9/20* (2006.01)
(Continued)

(52) U.S. Cl.
CPC ......... *G06K 9/2054* (2013.01); *G06K 9/4604* (2013.01); *G06T 3/4038* (2013.01);
(Continued)

(58) Field of Classification Search
USPC ................................................. 382/100, 103
See application file for complete search history.

(56) References Cited

U.S. PATENT DOCUMENTS 8,744,143 B2 * 6/2014 Chen .................... G06F 21/6245
                                                    348/143
9,407,674 B2 * 8/2016 Chan .................... G06F 3/04842
(Continued)

FOREIGN PATENT DOCUMENTS

JP        2013-197785        9/2013

OTHER PUBLICATIONS

David G. Lowe "Object Recognition from Local Scale-Invariant Features", Proc. of the International Conference on Computer Vision, Corfu (Sep. 20-27, 1999) <http://ieeexplore.ieee.org/document/790410/?arnumber=790410&tag=1>.

(Continued)

*Primary Examiner* — Ishrat I Sherali
(74) *Attorney, Agent, or Firm* — Greenblum & Bernstein, P.L.C.

(57) ABSTRACT

A method for processing an image includes calculating a vanishing point located at a same position in a plurality of images that are temporally successive, receiving specification of a target object whose privacy is to be protected in at least one of the plurality of images, calculating a target location area, which includes the vanishing point and in which the target object is located in each of the plurality of images, on the basis of the specification of the target object in the at least one of the plurality of images received in the receiving and the vanishing point calculated in the calculating the vanishing point, and performing image processing for protecting privacy in an area in each of the plurality of images located at a same position as the target location area calculated in the calculating the target location area.

12 Claims, 12 Drawing Sheets

(51) Int. Cl.
  *G06T 7/00* (2017.01)
  *G06T 5/00* (2006.01)
  *G06T 3/40* (2006.01)
  *H04N 1/44* (2006.01)
  *G06K 9/46* (2006.01)

(52) U.S. Cl.
  CPC ............ *G06T 5/002* (2013.01); *G06T 7/0044* (2013.01); *H04N 1/448* (2013.01); *G06T 2207/10016* (2013.01); *G06T 2207/30196* (2013.01)

(56) References Cited

U.S. PATENT DOCUMENTS

| | | | |
|---|---|---|---|
| 9,454,704 B2* | 9/2016 | Baba | G06K 9/00805 |
| 9,521,135 B2* | 12/2016 | Sultani | H04L 63/08 |
| 9,560,268 B2* | 1/2017 | Senot | H04W 4/021 |
| 9,582,709 B2* | 2/2017 | Wang | G06K 9/00288 |
| 2006/0132487 A1* | 6/2006 | Sada | G06T 7/20 345/427 |
| 2013/0242127 A1 | 9/2013 | Kasahara et al. | |
| 2015/0154460 A1 | 6/2015 | Baba et al. | |
| 2016/0063712 A1* | 3/2016 | Matsumoto | H04N 7/18 348/143 |
| 2016/0127641 A1* | 5/2016 | Gove | G06T 1/0007 348/143 |

OTHER PUBLICATIONS

Herbert Bay et al., "SURF:Speeded Up Robust Features" Computer Vision-ECCV 2006, vol. 3951 of the series Lecture Notes in Computer Science, pp. 404-417, May 2006 <http://rd.springer.com/chapter10.1007%2F11744023_32>.

The Extended European Search Report, dated Apr. 18, 2017, for the related European Patent Application No. 16198321.8.

* cited by examiner

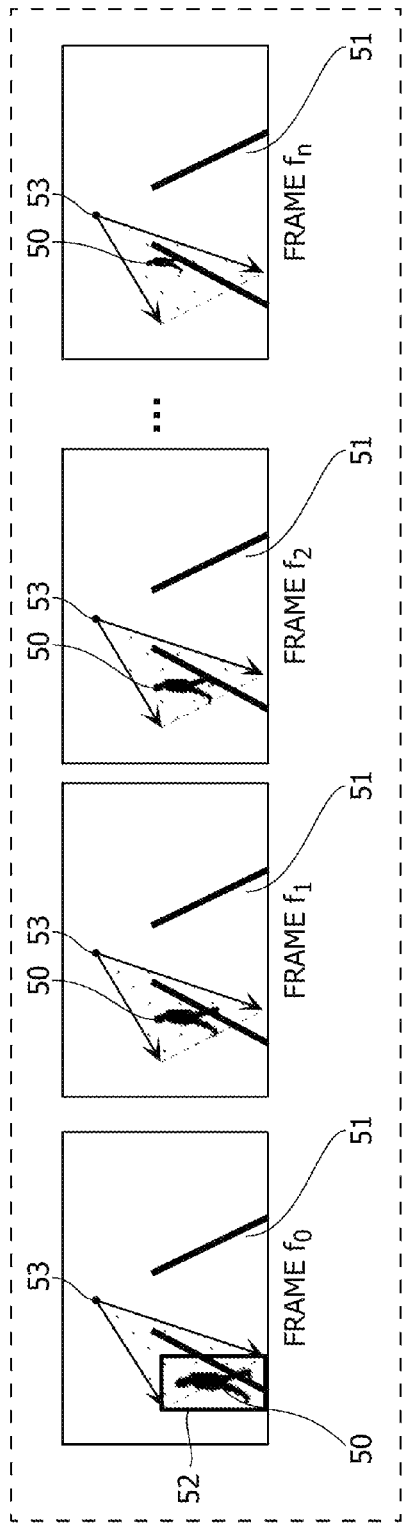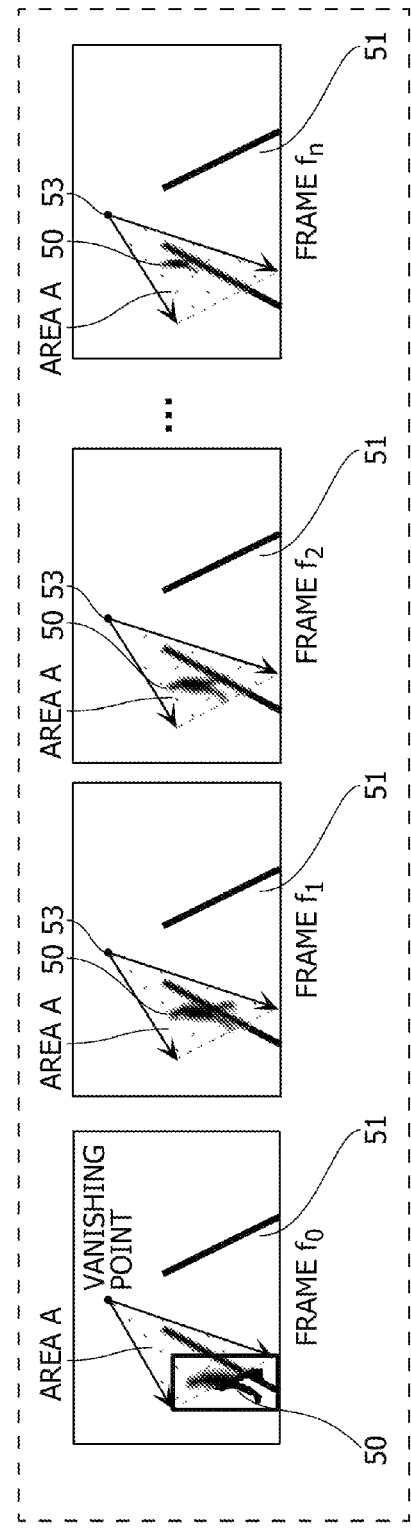

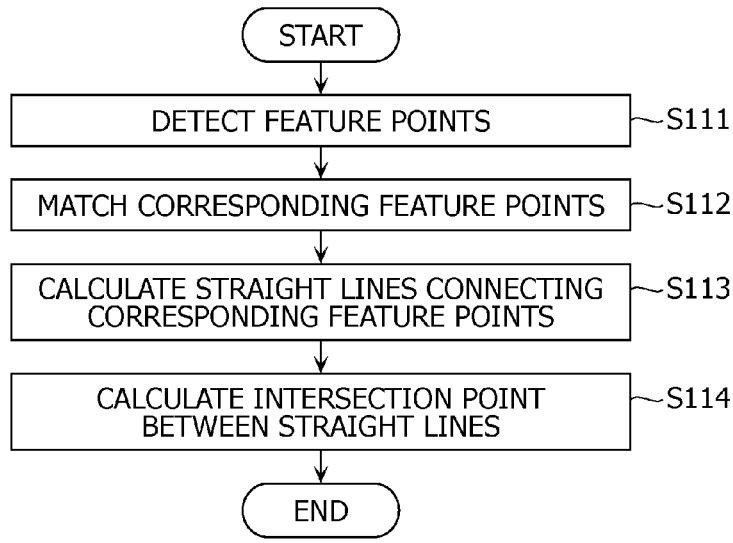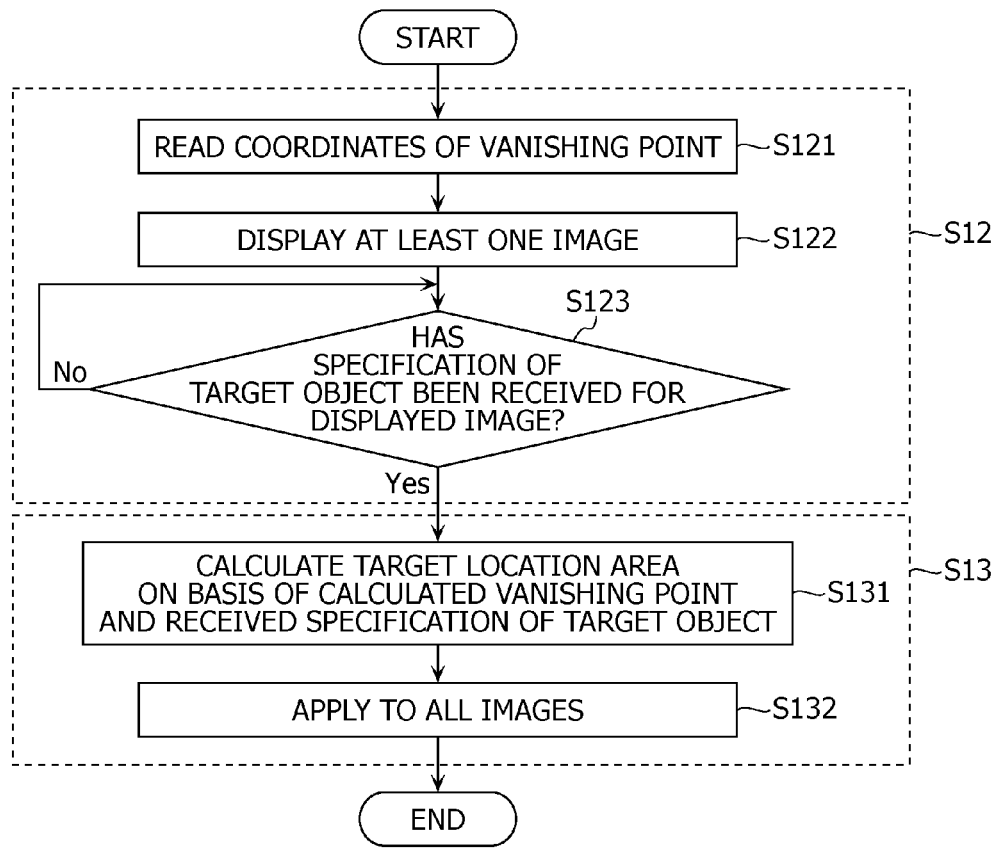

METHOD FOR PROCESSING IMAGE AND COMPUTER-READABLE NON-TRANSITORY RECORDING MEDIUM STORING PROGRAM

BACKGROUND

1. Technical Field

The present disclosure relates to a method for processing an image and a computer-readable non-transitory recording medium storing a program for performing image processing for protecting privacy.

2. Description of the Related Art

During these years, object recognition employing deep learning, which is a learning technique achieved by a neural network, is gaining attention. In the deep learning, a learning process is performed using a large number of tagged images, with which names and types of recognition targets such as objects are associated as tags, in order to achieve accurate object recognition.

The large number of tagged images can be prepared through crowdsourcing. That is, the large number of tagged images can be prepared by finding portions of images, such as photographs and video frames, necessary for the learning process, extracting the necessary portions, and adding tags through crowdsourcing. If an image such as a photograph or a video frame includes a target object whose privacy needs to be protected through image processing, such as a person, however, crowdsourcing is used after the photograph or the video frame is subjected to image processing for protecting privacy.

In Japanese Unexamined Patent Application Publication No. 2013-197785, for example, a technique for detecting a position of a face or a person through image recognition and replacing the detected face or person with another image is disclosed.

SUMMARY

In one general aspect, the techniques disclosed here feature a method for processing an image. The method includes calculating a vanishing point located at a same position in a plurality of images that are temporally successive, receiving specification of a target object whose privacy is to be protected in at least one of the plurality of images, calculating a target location area, which includes the vanishing point and in which the target object is located in each of the plurality of images, on the basis of the specification of the target object in the at least one of the plurality of images received in the receiving and the vanishing point calculated in the calculating the vanishing point, and performing image processing for protecting privacy in an area in each of the plurality of images located at a same position as the target location area calculated in the calculating the target location area.

According to the present disclosure, a method for processing an image and a program capable of certainly performing image processing for protecting privacy are achieved.

It should be noted that general or specific embodiments may be implemented as a system, a method, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a diagram illustrating an example of a method for calculating an area according to the embodiment;

FIG. 13 is a diagram illustrating an example of a method for processing an image according to the embodiment;

FIG. 18 is a flowchart illustrating an example of details of processing in step S11 illustrated in FIG. 17;

FIG. 19 is a flowchart illustrating an example of details of processing in steps S12 and S13 illustrated in FIG. 17.

DETAILED DESCRIPTION

Figure 1:
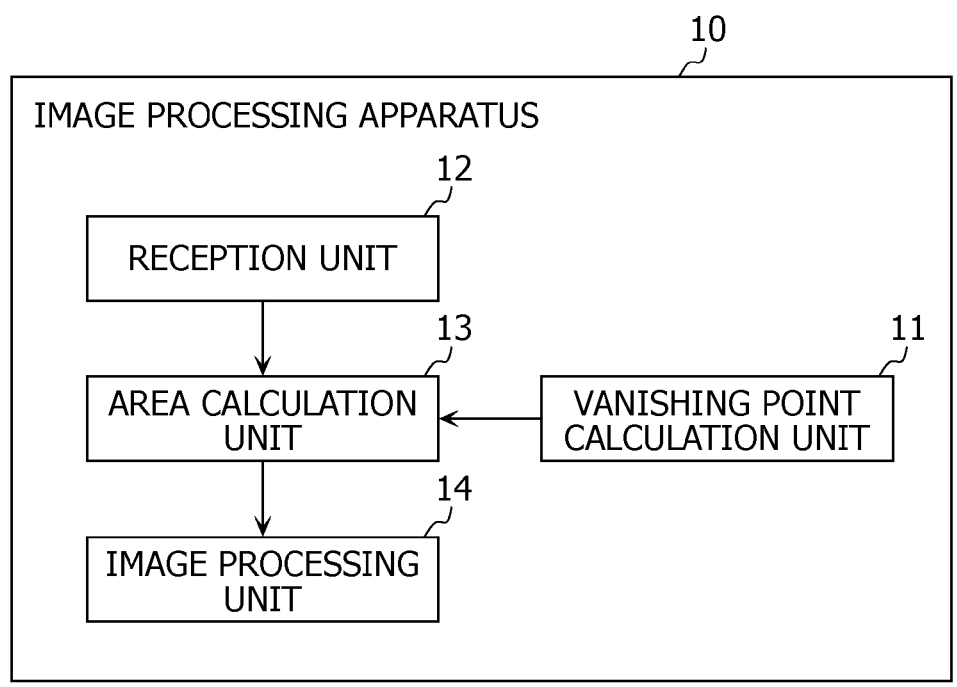
FIG. 1 is a diagram illustrating an example of a functional configuration of an image processing apparatus according to an embodiment.

Underlying Knowledge Forming Basis of the Present Disclosure

During these years, object recognition employing deep learning, which is a learning technique achieved by a neural network, is gaining attention.

In order to achieve high recognition performance in the object recognition employing the deep learning, a learning process needs to be performed using a large number of tagged images, with which names and types of target objects, which are recognition targets, are associated (labeled) as tags. The large number of tagged images requires a large amount of work, that is, portions of images, such as photographs and video frames, necessary for recognition need to be found and extracted and tags need to be added. Outsourcing such as crowdsourcing, therefore, might be used to find and extract the portions of the images, such as photographs and video frames, necessary for recognition and add tags.

In crowdsourcing, however, such work is outsourced to a large number of unspecified individuals (workers) through the Internet, and a large number of images such as photographs and video frames are distributed to the large number of unspecified individuals (workers). If an image such as a photograph or a video frame includes a target object whose privacy needs to be protected through image processing, such as a person, therefore, image processing for protecting privacy needs to be performed, before crowdsourcing is used, on the photograph or the video frame such that personal information (e.g., information with which the person's face, location, or identity can be identified) regarding the target object such as a person is not recognized.

In Japanese Unexamined Patent Application Publication No. 2013-197785, for example, a technique for detecting a position of a face or a person through image recognition and replacing the detected face or person with another image is disclosed. As described above, however, the detection accuracy of current image recognition is not perfect, and, in the example of the related art, a position of a face or a person might not be certainly detected. In the example of the related art, therefore, it is difficult to replace a face whose position has not been detected with another image, and image processing for protecting privacy might not be performed.

On the other hand, image processing for protecting privacy, such as blurring, might be uniformly performed on all images such as photographs and video frames in order to avoid such an error in detection. In this method, however, it is difficult for a worker employed through crowdsourcing to find a small recognition target (e.g., a person) in an image such as a photograph or a video frame, and the efficiency and accuracy of an operation for adding tags (labeling) undesirably decrease.

The present disclosure provides a method for processing an image and a program capable of certainly performing image processing for protecting privacy.

A method for processing an image according to an aspect of the present disclosure includes calculating a vanishing point located at a same position in a plurality of images that are temporally successive, receiving specification of a target object whose privacy is to be protected in at least one of the plurality of images, calculating a target location area, which includes the vanishing point and in which the target object is located in each of the plurality of images, on the basis of the specification of the target object in the at least one of the plurality of images received in the receiving and the vanishing point calculated in the calculating the vanishing point, and performing image processing for protecting privacy in an area in each of the plurality of images located at a same position as the target location area calculated in the calculating the target location area.

In this case, image processing for protecting privacy can be certainly performed.

Here, for example, the plurality of images may each include the target object. A size of the target object may increase or decrease in the plurality of images.

In addition, for example, the plurality of images may be included in a moving image captured by a vehicle camera.

In addition, for example, the image processing may be a mosaic process, blurring, or pixelization.

Here, for example, the calculating the vanishing point may include detecting feature points corresponding to a plurality of parts of the target object in each of at least two of the plurality of images, associating feature points on a first part of the target object included in the at least two of the plurality of images with each other and feature points on a second part of the target object included in the at least two of the plurality of images with each other, and calculating the vanishing point located at the same position in the plurality of images by calculating an intersection point between a first straight line connecting the associated feature points on the first part and a second straight line connecting the associated feature points on the second part.

In addition, for example, in the receiving, the specification of the target object may be received by receiving specification of coordinates of the target object included in the at least one of the plurality of images.

Here, for example, in the performing, different types of image processing may be performed between a certain portion, including the vanishing point, of the area located at the same position in each of the plurality of images and a portion other than the certain portion.

In addition, for example, the image processing may be blurring. In the performing, the image processing may be performed such that a degree of the blurring in the portion other than the certain portion becomes higher than a degree of the blurring in the certain portion.

In addition, for example, in the performing, the image processing may be performed in a portion of the area located at the same position in each of the plurality of images other than a certain portion including the vanishing point.

In addition, for example, in the performing, if the area located at the same position in each of the plurality of images includes a target object on which the image processing is not to be performed, the image processing may be performed in a portion of the area located at the same position other than the target object. In addition, for example, at least one of the calculating the vanishing point, the receiving the specification of a target object, calculating the target location area, and the performing the image processing may be performed by a processor.

It should be noted that these general or specific aspects may be implemented as a system, a method, an integrated circuit, a computer program, a computer-readable recording medium such as a CD-ROM, or any selective combination thereof.

A method for processing an image according to an aspect of the present disclosure and the like will be specifically described hereinafter with reference to the drawings. An embodiment that will be described hereinafter is a specific example of the present disclosure. Values, shapes, materials, components, arrangement positions of the components, and the like mentioned in the following embodiment are examples, and do not limit the present disclosure. Among the components described in the following embodiment, ones not described in the independent claims, which define broadest concepts, will be described as arbitrary components.

EMBODIMENT

Overall Configuration of Image Processing Apparatus 10

FIG. 1 is a diagram illustrating an example of a functional configuration of an image processing apparatus 10 according to an embodiment.

The image processing apparatus 10 performs image processing for protecting privacy on a plurality of images including a target object whose privacy needs to be protected through image processing. In the present embodiment, as illustrated in FIG. 1, the image processing apparatus 10 includes a vanishing point calculation unit 11, a reception unit 12, an area calculation unit 13, and an image processing unit 14. These components will be described in detail hereinafter.

Configuration of Vanishing Point Calculation Unit 11

Figure 2:
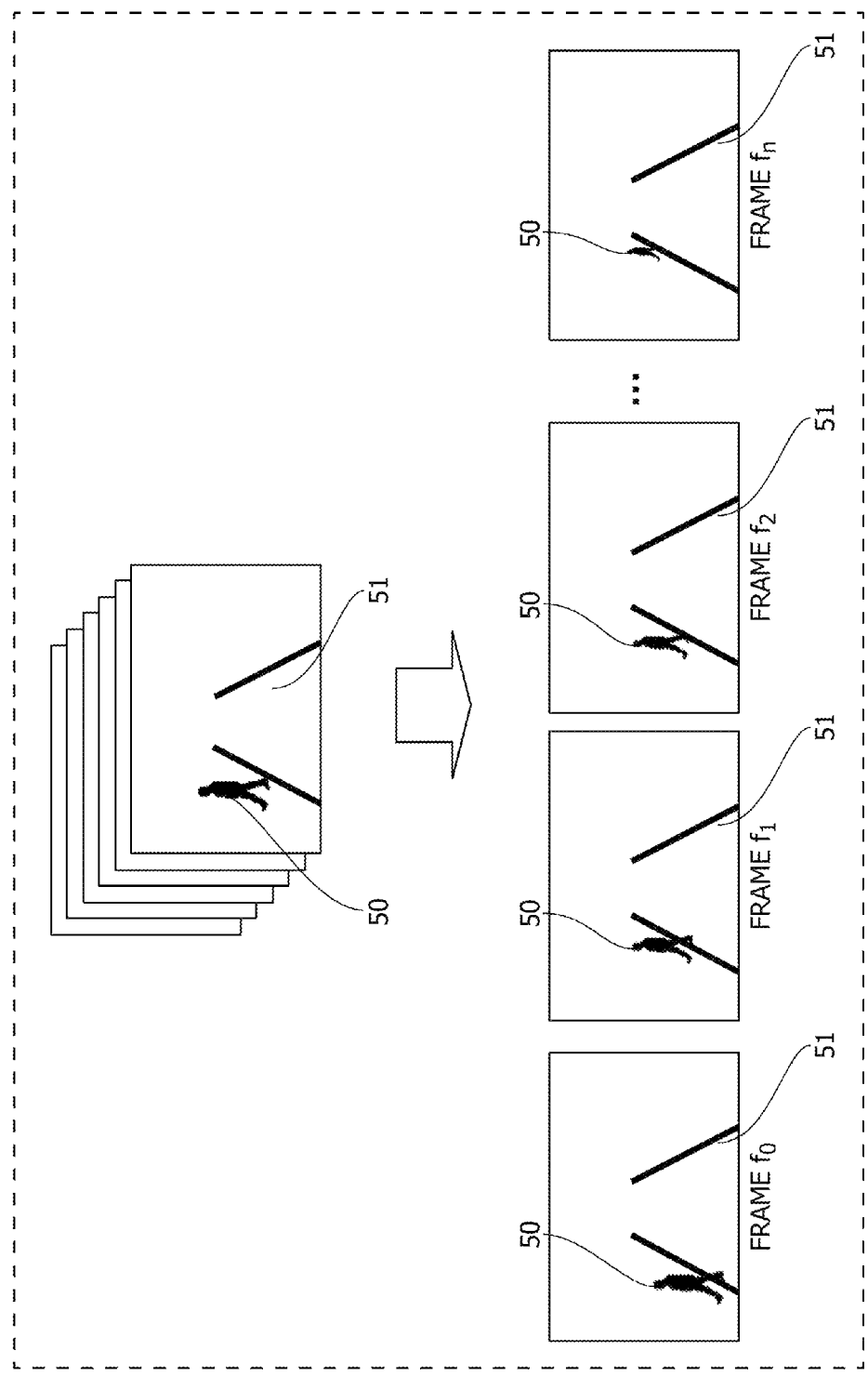
FIG. 2 is a diagram illustrating an example of a plurality of images according to the embodiment.
Figure 3:
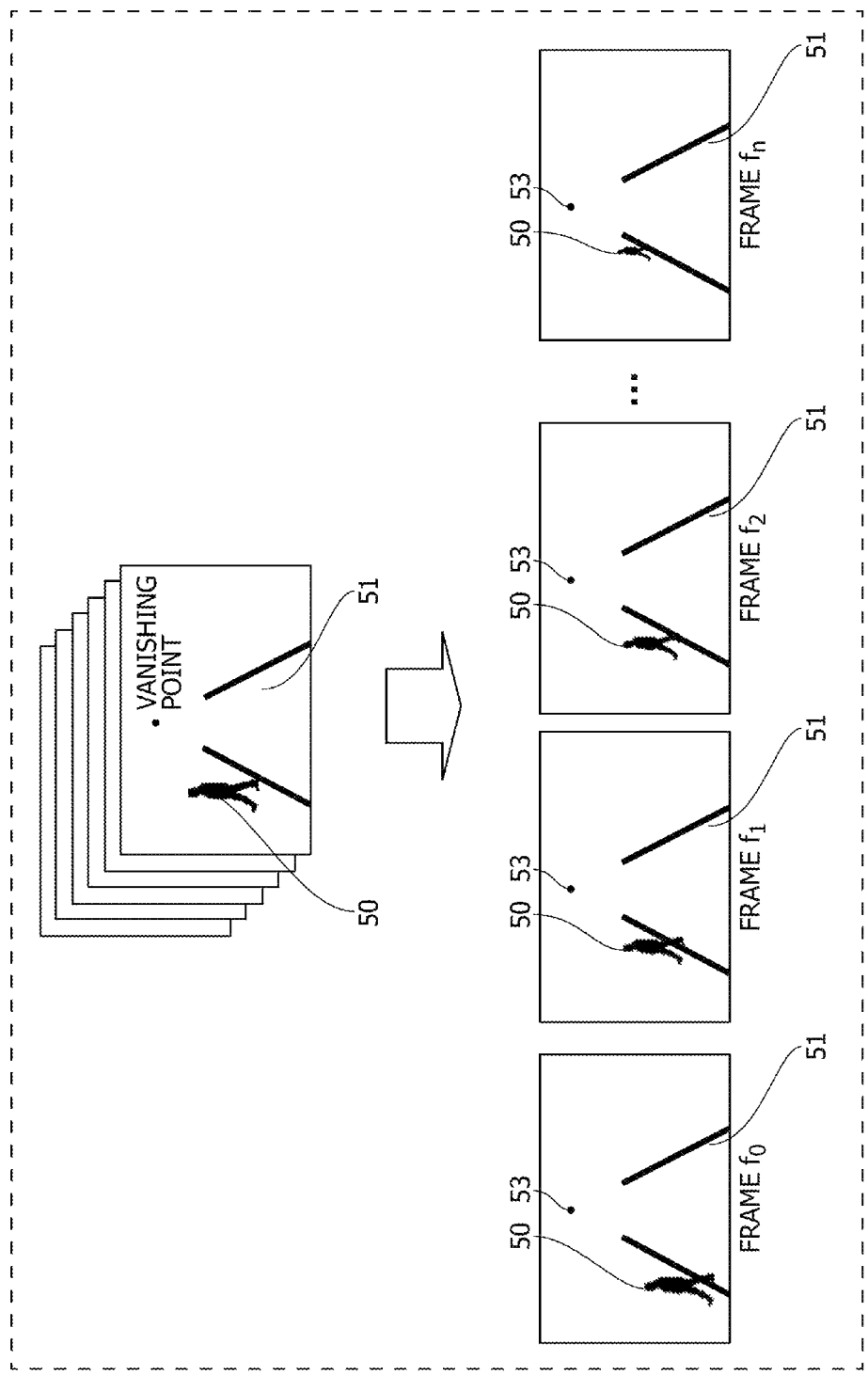
FIG. 3 is a diagram illustrating a vanishing point in the plurality of images illustrated in FIG. 2.
Figure 4:
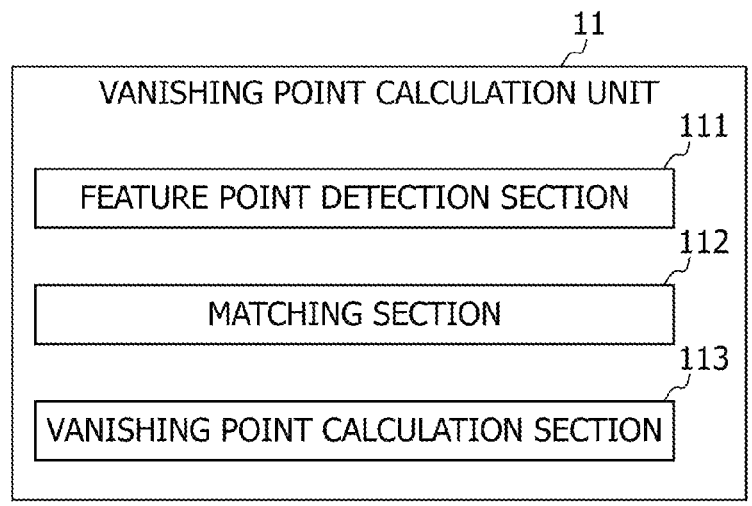
FIG. 4 is a diagram illustrating an example of a functional configuration of a vanishing point calculation unit illustrated in FIG. 1.

FIG. 2 is a diagram illustrating an example of a plurality of images according to the present embodiment. FIG. 3 is a diagram illustrating a vanishing point 53 in the plurality of images illustrated in FIG. 2. FIG. 4 is a diagram illustrating an example of a functional configuration of the vanishing point calculation unit 11 illustrated in FIG. 1.

The vanishing point calculation unit 11 calculates a vanishing point located at the same position in a plurality of temporally successive images. In the present embodiment, the vanishing point calculation unit 11 calculates the vanishing point 53, which is illustrated in FIG. 3, located at the same position in the plurality of temporally successive images illustrated in FIG. 2.

The plurality of temporally successive images will be described with reference to FIG. 2.

The plurality of images illustrated in FIG. 2 are images for requesting an operation for adding tags through crowdsourcing and, for example, are images included in a moving image captured by an image capture device (vehicle camera), such as a camera, mounted on a vehicle running straight. More specifically, the plurality of images illustrated in FIG. 2 are frames $f_0, f_1, f_2, \ldots,$ and $f_n$, each of which shows (includes) a person 50 and a road 51. The person 50 is an example of a target object whose privacy is to be protected. Because a vehicle such as an automobile usually moves faster than the person 50 in images included in a moving image captured by a vehicle camera, the person 50 is moving away (or closer) in the frames $f_0, f_1, f_2, \ldots,$ and $f_n$.

The plurality of images illustrated in FIG. 2 are not limited to images included in a moving image captured by a vehicle camera. The plurality of images illustrated in FIG. 2 may be images included in a moving image captured by an image capture device, such as a camera, attached to a person who is running a road, instead. Alternatively, the plurality of images illustrated in FIG. 2 may be images included in a moving image captured by an image capture device, such as a camera, mounted on a vehicle such as an automobile. That is, the plurality of images in the present embodiment may be any kind of images insofar as the images are captured by an image capture device mounted on a vehicle running straight faster than a target object (images equivalent to a plurality of images captured by a vehicle camera). In other words, the plurality of images in the present embodiment may be any kind of images insofar as the images 1) are temporally successive, 2) include a vanishing point at the same position, 3) include a target object whose privacy is to be protected, such as a person, and 4) include a target object whose size increases or decreases.

In the present embodiment, as illustrated in FIG. 4, the vanishing point calculation unit 11 includes a feature point detection section 111, a matching section 112, and a vanishing point calculation section 113.

The feature point detection section 111 detects feature points on different parts of the target object in at least two of the plurality of images. If the target object is the person 50, for example, the feature point detection section 111 detects body parts of the person 50. The body parts of the person 50 are, for example, the head, right hand, left hand, right foot, left foot, face, and/or abdomen of the person 50. The feature point detection section 111 detects a point on each part of the target object as a feature point. A method for detecting feature points may be a method for manually detecting feature points or a method for automatically detecting feature points.

Figure 5:
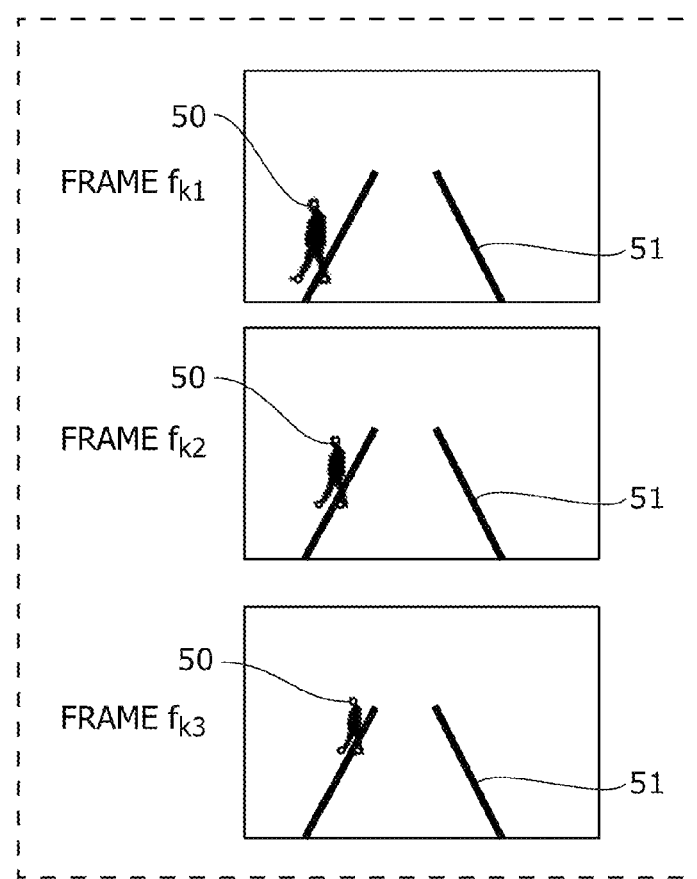
FIG. 5 is a diagram illustrating an example of manual detection of feature points according to the embodiment.

As illustrated in FIG. 5, in the method for manually detecting feature points, for example, any body parts, such as peripheral parts including the head and the toes, the center of the face, and the center of the abdomen, may be selected insofar as the body parts can be uniquely defined on the target object. FIG. 5 is a diagram illustrating an example of manual detection of feature points according to the present embodiment. In this example, feature points in three temporally successive images (frames $f_{k1}$, $f_{k2}$, and $f_{k3}$) among the plurality of images (frames $f_0$ to $f_n$) illustrated in FIG. 2 are detected. Although three feature points are detected as feature points on different body parts (peripheral parts) of the person 50 in each of the temporally successive images (frames $f_{k1}$, $f_{k2}$, and $f_{k3}$) in the example illustrated in FIG. 5, the feature points to be detected are not limited to these. Feature points on at least two different body parts of the person 50 are enough.

In the method for automatically detecting feature points, a local feature detector is used for images. Typical local feature detectors include a scale-invariant feature transform (SIFT) (refer to Lowe, avid G. (1999), "Object recognition from local scale-invariant features", Proceedings of the International Conference on Computer Vision., pp. 1150-1157, doi:10.1109/ICCV.1999.790410) and a speeded-up robust features (SURF) (refer to Herbert Bay, Andreas Ess, Tinne Tuytelaars, and Luc Van Gool, "Speeded Up Robust Features", ETH Zurich, Katholieke Universiteit Leuven). One of characteristics of such a local feature detector is invariance under rotation of an image or a change in scale (size). That is, even if an image is rotating or the size of the image changes, a feature value output from the local feature detector remains the same. The matching section 112, which will be described later, therefore, can achieve matching between feature points included in images whose sizes are different from each other. Since details of the local feature detector are described in the above two documents, only outlines will be described hereinafter.

In the SIFT, calculation of scale and detection of key points (feature points) are simultaneously performed. By detecting the scale of the key points and normalizing the key points with the scale, feature points obtained from images of any size can be treated as having the same size. In order to detect the scale, the scale of an image is changed, and Gaussian filters whose variances are different from each other are used. A difference between each of three pairs of images subjected to the filtering process is then obtained, and an extremum obtained from three difference images is used to obtain the scale. An extremum refers to a pixel whose value becomes maximum or minimum in relation to 26 nearby pixels when three difference images having successive variances obtained by sequentially changing variance have been selected. In this pixel, a difference in the pixel value is larger than in the nearby pixels when the scale is changed, which means that the pixel is a characteristic pixel of an object. The variance of a Gaussian filter when the extremum is obtained is proportional to the scale of an image.

For example, if an extremum σ1 is 5 in a certain image (e.g., 200×200 pixels), an extremum σ2 is 10 in an image (400×400 pixels) twice as large as the certain image. By performing this process on all the images, an extremum of each pixel of the images can be obtained, and the scale of each image can be calculated from the extremum of each pixel. In addition, an area around a pixel having an extremum is divided into blocks, gradient directions are obtained, and a gradient direction that appears most frequently is then obtained using a histogram. By rotating the most frequent gradient direction to certain direction (e.g., upward) for each key point, the direction of each key point becomes the same even if an image is rotated. By obtaining the histogram (feature values), images can be matched with one another as described later.

The SURF is a simplified, high-speed version of the SIFT. In the SURF, the filtering process is performed using not Gaussian filters, which include real numbers, but rectangular filters, which approximate Gaussian filters by including discrete values of 0 and 1.

Other processes are the same as in the case of the SIFT. Feature points and values invariant under rotation of an image or a change in the scale can be obtained.

The matching section 112 matches corresponding feature points detected by the feature point detection section 111 in the at least two of the plurality of images. It is assumed that the matching section 112 matches feature points in two images. In this case, for example, feature points on the same body parts of the person 50 included in the two images are associated with each other. For example, feature points on a first part (e.g., the head) of the person 50 included in the two images are associated with each other. Similarly, feature points on a second part (e.g., the right foot) of the person 50 included in the two images are associated with each other.

In addition, for example, feature points on a third part (e.g., the left foot) of the person 50 included in the two images may be associated with each other.

Although the matching is performed in two of a plurality of images in the above example, the feature points on the first, second, and third parts may be associated with one another in three or more images.

Figure 6:
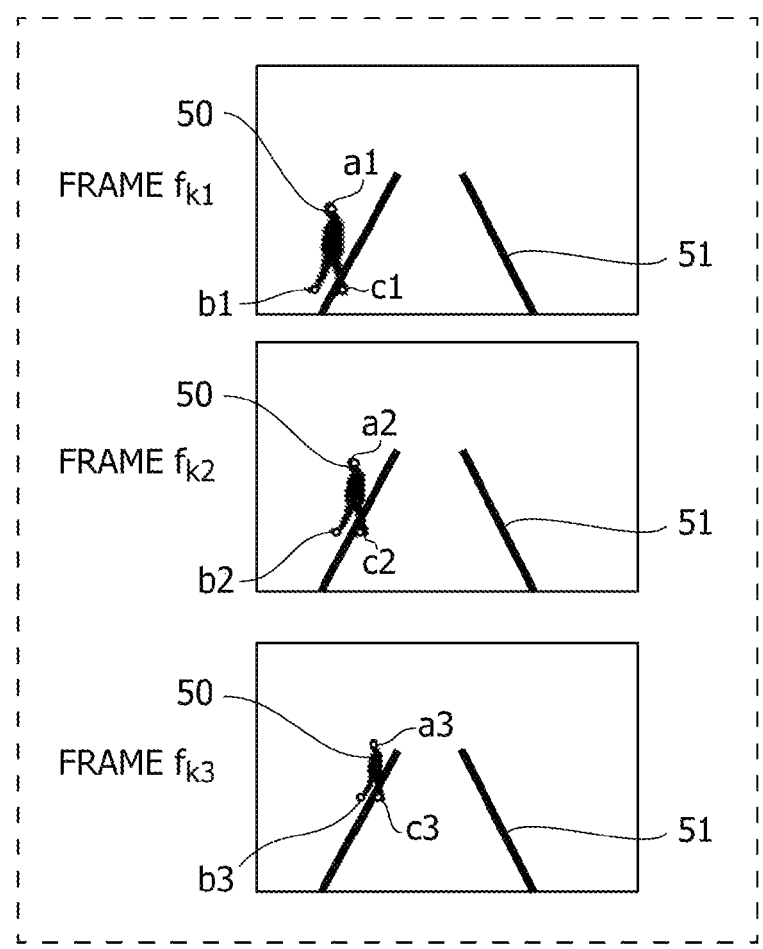
FIG. 6 is a diagram illustrating a matching method according to the embodiment.

The matching will be described in more detail hereinafter with reference to FIGS. 5 and 6. FIG. 6 is a diagram illustrating a matching method according to the present embodiment. The matching section 112 matches (associates), through calculation, feature points detected in the temporally successive images (frames $f_{k1}$, $f_{k2}$, and $f_{k3}$) illustrated in FIG. 5. More specifically, as illustrated in FIG. 6, the matching section 112 associates manually specified feature points a1, a2, and a3 on the head of the person 50 in the frame $f_{k1}$, $f_{k2}$, and $f_{k3}$, respectively, with one another as feature points on the head of the person 50. The matching section 112 also associates feature points b1, b2, and b3 on the right foot of the person 50 in the frame $f_{k1}$, $f_{k2}$, and $f_{k3}$, respectively, with one another as feature points on the right foot of the person 50. The matching section 112 also associates feature points c1, c2, and c3 on the left foot of the person 50 in the frame $f_{k1}$, $f_{k2}$, and $f_{k3}$, respectively, with one another as feature points on the left foot of the person 50. If feature values of feature points automatically obtained by a local feature detector are used, degrees of similarity (histogram intersections: overlap ratios of histograms) between feature value histograms of all feature points in a plurality of images are obtained, and feature points whose histograms are most similar to each other are associated with each other as corresponding points. As a result, feature points in temporally successive images can be automatically matched with each other.

The vanishing point calculation section 113 draws straight lines connecting the corresponding feature points and calculates an intersection point between the straight lines to calculate a vanishing point located at the same position in the plurality of images. It is assumed, for example, that feature points are matched with each other in two of a plurality of images. In this case, for example, one of the two images is used as a reference image, and a feature point on the first part and a feature point on the second part included in the other image are shown in the reference image.

In this case, the reference image includes two feature points on the first part and two feature points on the second part. An intersection point between a straight line (first straight line) connecting the feature points on the first part of the person 50 and a straight line (second straight line) connecting the feature points on the second part of the person 50 is then calculated as a vanishing point.

Although two of a plurality of images are used in the above example, an intersection point between two straight lines may be obtained using three of a plurality of images, instead.

Alternatively, in the above example, a straight line (third straight line) connecting feature points on the third part (e.g., the left foot) of the person 50 may also be obtained in the two images, and an intersection point between the first, second, and third lines may be calculated as a vanishing point.

Figure 7:
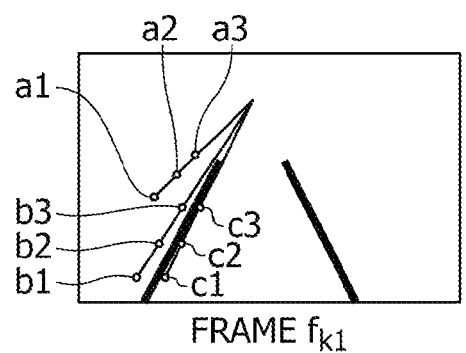
FIG. 7 is a diagram illustrating a method for calculating a vanishing point according to the embodiment.
Figure 8:
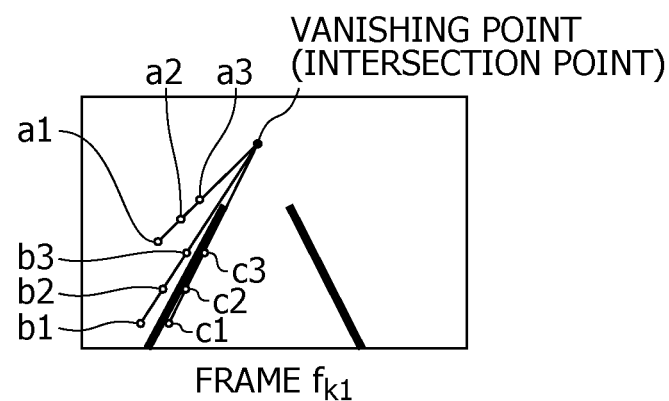
FIG. 8 is a diagram illustrating a method for calculating a vanishing point according to the embodiment.

The calculation of a vanishing point will be described in more detail hereinafter with reference to FIGS. 7 and 8. FIGS. 7 and 8 are diagrams illustrating a method for calculating a vanishing point according to the present embodiment.

The vanishing point calculation section 113 shows all the feature points matched (associated) by the matching section 112 in, say, the frame $f_{k1}$ and draws straight lines connecting the associated feature points as illustrated in FIG. 7. That is, the vanishing point calculation section 113 draws a straight line connecting the feature points a1, a2, and a3, a straight line connecting the feature points b1, b2, and b3, and a straight line connecting the feature points c1, c2, and c3. Because the vanishing point calculation section 113 can draw the straight lines connecting the feature points a1 to a3, b1 to b3, and c1 to c3 through calculation, the vanishing point calculation section 113 need not actually draw the straight lines in the frame $f_{k1}$ illustrated in FIG. 7. The vanishing point calculation section 113 then calculates an intersection point between the calculated three straight lines and obtains the calculated intersection point as a vanishing point as illustrated in FIG. 8. As described above, in the present embodiment, a vanishing point is located at the same position in a plurality of images. Each image usually includes only one vanishing point, and each of a plurality of temporally successive images captured by an image capture device such as a vehicle camera usually includes a vanishing point at the same position (position coordinates). Calculation of a vanishing point, therefore, means calculation of a vanishing point for all the plurality of images (frames $f_0$ to $f_n$) in the present embodiment.

Configuration of Reception Unit 12

Figure 9:
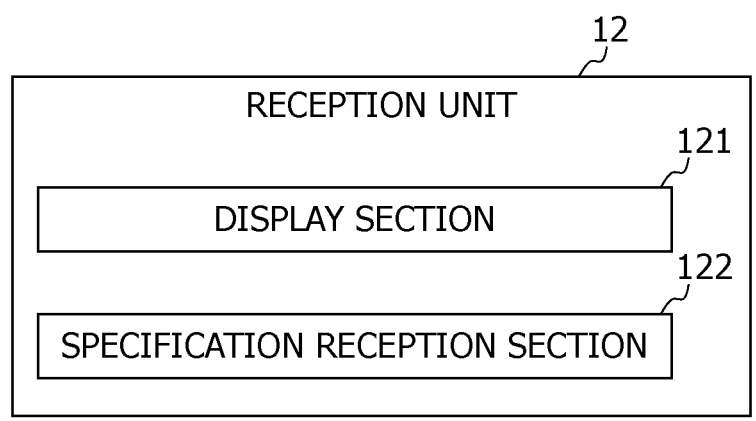
FIG. 9 is a diagram illustrating an example of a functional configuration of a reception unit illustrated in FIG. 1.
Figure 10:
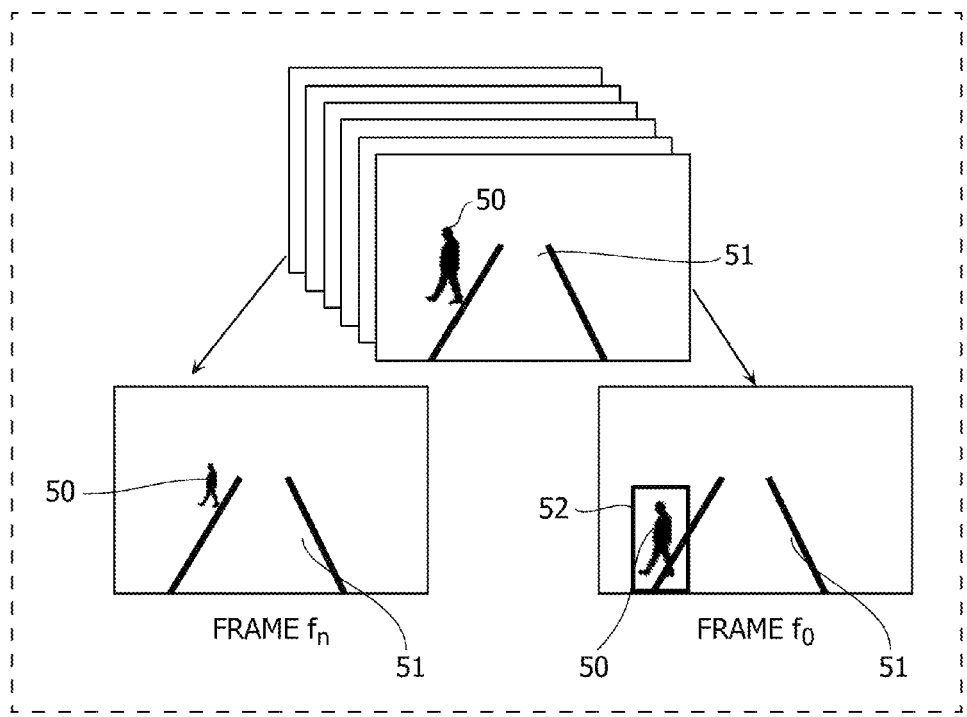
FIG. 10 is a diagram illustrating an example of a method for specifying a target object according to the embodiment.

FIG. 9 is a diagram illustrating an example of a functional configuration of the reception unit 12 illustrated in FIG. 1. FIG. 10 is a diagram illustrating an example of a method for specifying a target object according to the present embodiment.

The reception unit 12 receives specification of a target object whose privacy is to be protected in at least one of a plurality of images. More specifically, the reception unit 12 receives specification of a target object by receiving specification of coordinates of a target object in at least one of a plurality of images.

In the present embodiment, as illustrated in FIG. 9, the reception unit 12 includes a display section 121 and a specification reception section 122.

The display section 121 displays at least one of a plurality of images. In the present embodiment, as illustrated in FIG. 10, for example, the display section 121 selects the frame $f_0$ as the at least one of the plurality of images (frames $f_0$ to $f_n$).

In view of processing performed by the area calculation unit 13, the display section 121 desirably selects, as the at least one of the plurality of images, an image in which the target object whose privacy is to be protect is largest, such as the frame $f_0$. The display section 121 need not select an image in which the target object whose privacy is to be protected is largest, such as the frame $f_0$, but may select any image. The number of images displayed by the display section 121 may be one, but the display section 121 may simultaneously or sequentially display a plurality of images, instead.

The specification reception section 122 receives specification of coordinates of a target object whose privacy is to be protected in at least one of a plurality of images displayed by the display section 121. In the present embodiment, as illustrated in FIG. 10, for example, the specification reception section 122 receives, in the frame $f_0$, which is the image displayed by the display section 121, specification of coordinates (position and size) of the person 50, who is the target object whose privacy is to be protected, performed by a specifier such as a user of the image processing apparatus 10. FIG. 10 illustrates an example in which a rectangle 52 indicating the position and size of the person 50 is displayed as the specification of a target object. The specifier may display the rectangle 52 indicating the position and size of the person 50 by moving a position of a rectangle displayed at the same time as the image and enlarging or reducing the rectangle. Alternatively, the specifier may display the rectangle 52 indicating the position and size of the person 50 by specifying coordinates of an upper-left corner and a lower-right corner of the person 50 illustrated in FIG. 10.

Configuration of Area Calculation Unit 13

Figure 11:
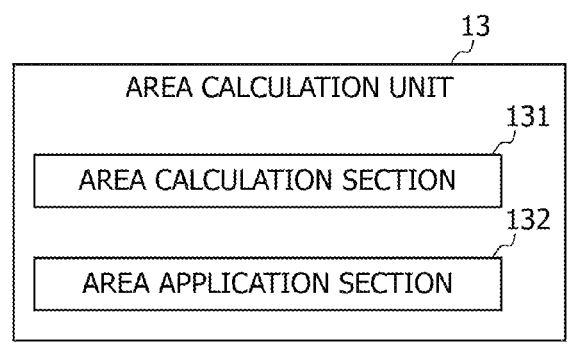
FIG. 11 is a diagram illustrating an example of a functional configuration of an area calculation unit illustrated in FIG. 1.

FIG. 11 is a diagram illustrating an example of a functional configuration of the area calculation unit 13 illustrated in FIG. 1. FIG. 12 is a diagram illustrating an example of a method for calculating an area according to the present embodiment.

The area calculation unit 13 calculates a target location area, which includes a vanishing point calculated by the vanishing point calculation unit 11 and in which a target object can be located in a plurality of images on the basis of specification of the target object in at least one of the plurality of images received by the reception unit 12 and the vanishing point.

In the present embodiment, as illustrated in FIG. 11, the area calculation unit 13 includes an area calculation section 131 and an area application section 132.

The area calculation section 131 calculates, through interpolation or extrapolation, an area in which a target object can be located in a plurality of images as a target location area on the basis of a vanishing point in at least one of the plurality of images and a position and a size of the target object included in the at least one of the plurality of images.

The area application section 132 applies a target location area calculated by the area calculation section 131 to a plurality of images.

More specifically, in the example illustrated in FIG. 12, the area calculation section 131 can calculate, as a target location area, in which a target object can be located in a plurality of images, an area surrounded by a straight line connecting an upper-left corner of the rectangle 52 and the vanishing point 53 in the frame $f_0$, which is the at least one of the plurality of images, and a straight line connecting a lower-right corner of the rectangle 52 and the vanishing point 53 in the frame $f_0$, which is the at least one of the plurality of images. The area application section 132 may then apply an area in each of the other images (frames $f_1$ to $f_n$) located at the same position as the target location area in the frame $f_0$ calculated by the area calculation unit 13 as a target location area. Since the plurality of images are temporally successive images included in a moving image captured by a vehicle camera or equivalent images, the person 50 is located, according to perspective, in the plurality of images in an area (target location area) in the frame $f_0$ obtained by connecting the vanishing point 53 and the rectangle 52, which indicates the position and size of the person 50. The area located at the same position as the calculated target location area can therefore be calculated as the target location area in each of the plurality of images.

Configuration of Image Processing Unit 14

FIG. 13 is a diagram illustrating an example of a method for processing an image according to the present embodiment.

The image processing unit 14 performs image processing for protecting privacy in an area in each of a plurality of images located at the same position as a target location area calculated by the area calculation unit 13. The image processing is a mosaic process, pixelization, or blurring.

More specifically, in the example illustrated in FIG. 13, the image processing unit 14 performs image processing for protecting privacy in a target location area (an area A in FIG. 13) in the plurality of images (frames $f_1$ to $f_n$) calculated by the area calculation unit 13.

As a result of the image processing, a worker employed through crowdsourcing can see the target object but cannot tell what kind of object the target object is, and the target object's privacy can be protected. The image processing may be, for example, blurring in which a target location area in an image is blurred using a filter such as a Gaussian filter or an averaging filter or may be a mosaic process (pixelization) in which a target location area in an image is pixelated.

The method for processing an image is not limited to these examples. Any method may be used insofar as a worker employed through crowdsourcing can see a target object but cannot tell what kind of object the target object is.

Figure 14:
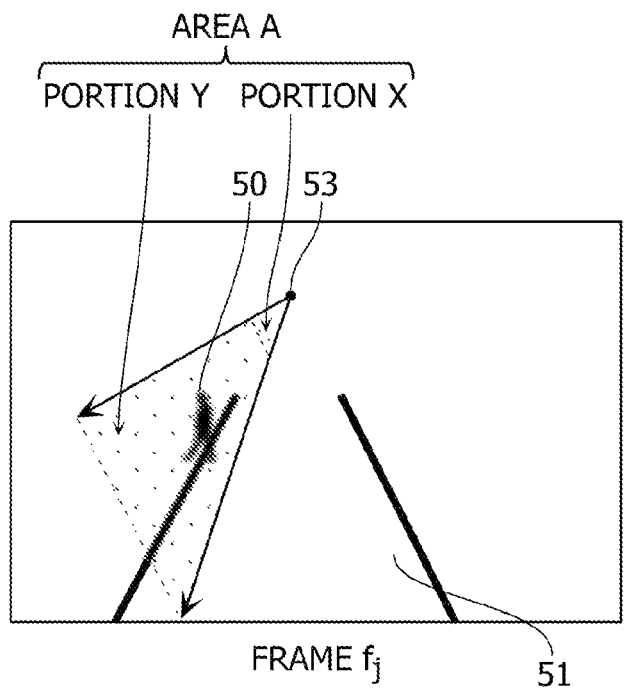
FIG. 14 is a diagram illustrating another example of the method for processing an image according to the embodiment.
Figure 15:
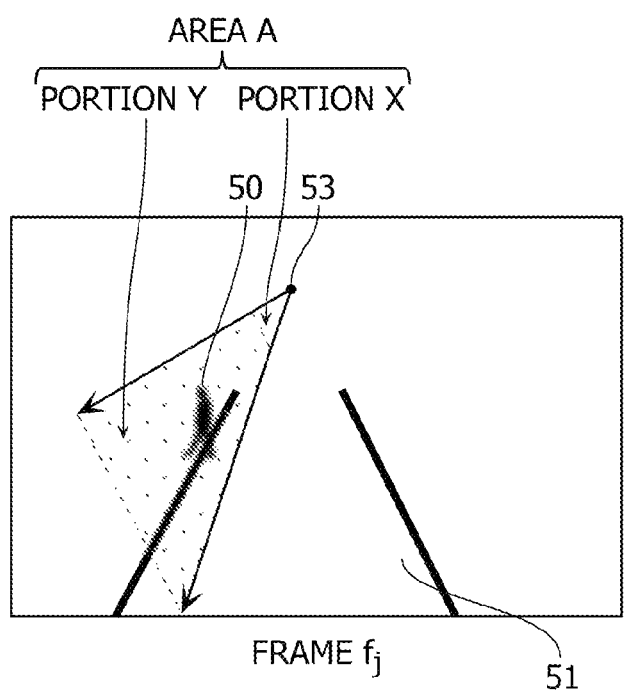
FIG. 15 is a diagram illustrating another example of the method for processing an image according to the embodiment.

Although the image processing unit 14 performs image processing in the entirety of the target location area in the example illustrated in FIG. 13, an area in which the image processing unit 14 performs image processing is not limited to this. Since a target object such as a person located in a target location area close to a vanishing point is small, a worker employed through crowdsourcing might not be able to recognize the target object. The image processing unit 14, therefore, need not perform image processing in a portion of the target location area close to the vanishing point, and may perform, in the portion close to the vanishing point, another type of image processing in which a degree of blurring is decreased. This case will be described hereinafter with reference to FIGS. 14 and 15. FIGS. 14 and 15 are diagrams illustrating another example of the method for processing an image according to the present embodiment.

The image processing unit 14 may perform different types of image processing between a certain portion of the target location area including the vanishing point and a portion of the target location area other than the certain portion in each of the plurality of images. For example, the image processing unit 14 may perform image processing such that the degree of blurring in the certain portion becomes lower than the degree of blurring in the portion of the target location area other than the certain portion. More specifically, as indicated by a frame $f_j$ illustrated in FIG. 14, for example, the image processing unit 14 may perform image processing such that the degree of blurring in a portion X of the target location area (the area A in FIG. 14) in each of the plurality of images (frames $f_1$ to $f_n$) including the vanishing point 53 becomes lower than the degree of blurring in a portion Y (a portion of the area A other than the portion X). As a result, a worker employed through crowdsourcing can easily recognize small target objects in images and add tags (labeling). The degree of blurring is an example of a factor used for the different types of image processing, and the different types of image processing may be achieved by a degree of a mosaic process or a degree of pixelization. The portion X may be determined on the basis of one of the plurality of images (frames $f_1$ to $f_n$) in which a target object whose privacy is to be protected is smallest.

Alternatively, the image processing unit 14 may perform image processing only in the portion of the target location area other than the certain portion including the vanishing point 53 in each of the plurality of images. More specifically, as indicated by the frame $f_j$ illustrated in FIG. 15, for example, the image processing unit 14 need not perform image processing in the portion X, which includes the vanishing point 53, of the target location area (the area A in FIG. 15) in each of the plurality of images (frames $f_1$ to $f_n$) but may perform image processing only in the portion Y (the portion of the area A other than the portion X). In this case, a worker employed through crowdsourcing can recognize small target objects in images and correctly add tags (labeling).

Figure 16:
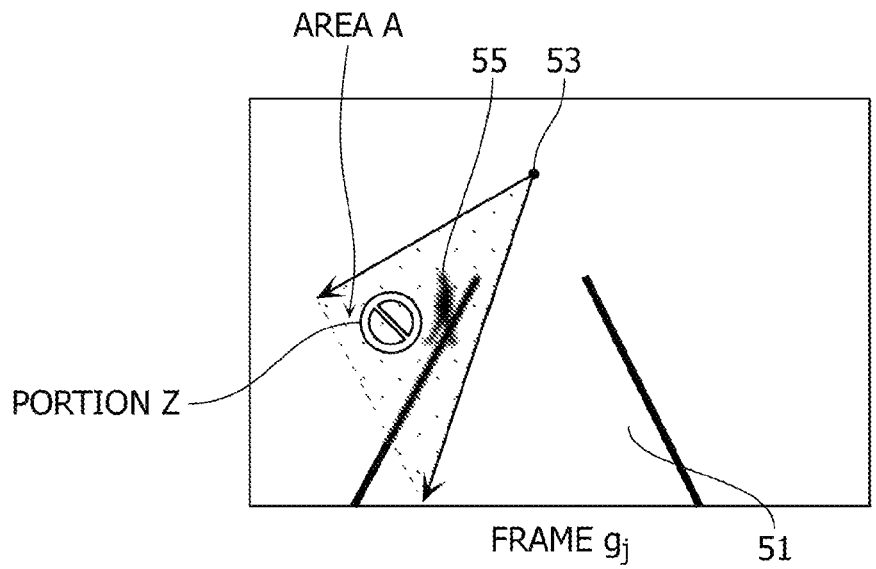
FIG. 16 is a diagram illustrating another example of the method for processing an image according to the embodiment.

The factors used for the different types of image processing performed by the image processing unit 14 in the target location area are not limited to the above examples. If target objects are a person and a road sign (a warning sign, a regulatory sign, an indicating sign, or the like), the image processing unit 14 need not perform image processing on the road sign in the target location area. This case will be described hereinafter with reference to FIG. 16. FIG. 16 is a diagram illustrating another example of the method for processing an image according to the present embodiment.

If one of target objects in the target location area in each of the plurality of images is a target object on which image processing is not to be performed, the image processing unit 14 may perform image processing in a portion of the target location area other than the target object. More specifically, as indicated by a frame $g_j$ illustrated in FIG. 13, for example, if a target location area (the area A in FIG. 16) in each of a plurality of images (e.g., frames $g_1$ to $g_n$) includes a road sign and the road sign is a target object, the image processing unit 14 may perform image processing in the target location area (area A) other than a portion Z surrounding the road sign. In this case, the image processing unit 14 can perform image processing on a target object whose privacy is to be protected, such as a person 55, and does not perform image processing on the road sign, which is a target object but does not require privacy. As a result, a worker employed through crowdsourcing can easily and correctly add tags (labeling) to target objects such as road signs.

Operation Performed by Image Processing Apparatus 10

Next, an operation performed by the image processing apparatus 10 configured as described above will be described.

Figure 17:
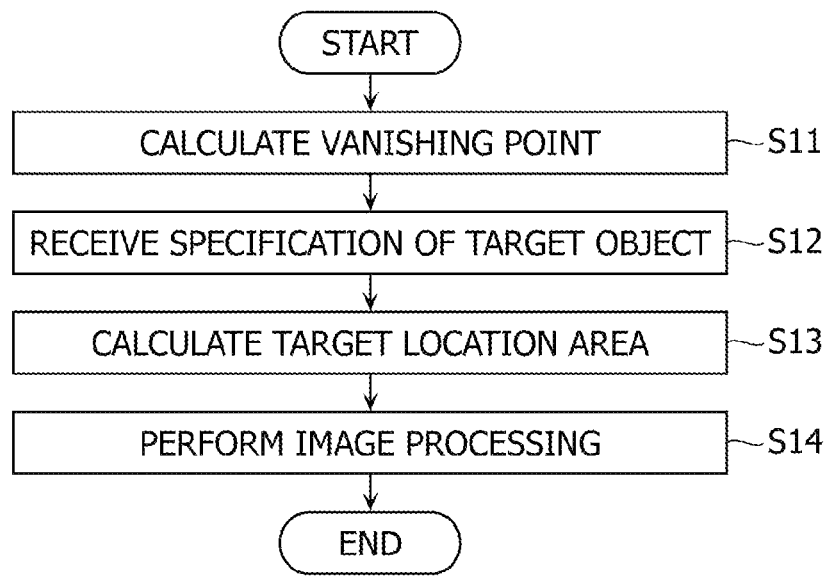
FIG. 17 is a flowchart illustrating an example of an operation performed by the image processing apparatus according to the embodiment.

FIG. 17 is a flowchart illustrating an example of the operation performed by the image processing apparatus 10 according to the present embodiment. FIG. 18 is a flowchart illustrating an example of details of processing in step S11 illustrated in FIG. 17. FIG. 19 is a flowchart illustrating an example of details of processing in steps S12 and S13 illustrated in FIG. 17.

First, the image processing apparatus 10 calculates a vanishing point located at the same position in a plurality of temporally successive images (S11). More specifically, as illustrated in FIG. 18, the image processing apparatus 10 detects feature points in at least two of the plurality of images (S111). Next, the image processing apparatus 10 matches corresponding feature points in at least two of the plurality of images (S112). Next, the image processing apparatus 10 calculates straight lines connecting the corresponding feature points (S113) and then calculates an intersection point between the calculated straight lines (S114). The image processing apparatus 10 can thus calculate a vanishing point located at the same position in the plurality of images. Details of the processing performed in steps S111 to S114 have already been described above and are not described again.

Next, the image processing apparatus 10 receives, in at least one of the plurality of images, specification of a target object whose privacy is to be protected (S12). More specifically, as illustrated in FIG. 19, first, the image processing apparatus 10 reads coordinates of the vanishing point calculated in step S11 (S121). Next, the image processing apparatus 10 displays at least one of the plurality of images (S122). Next, the image processing apparatus 10 determines whether specification of a target object whose privacy is to be protected has been received in the at least one of the plurality of images displayed in step S122 (S123). If determining that specification of a target object has not been received (NO in step S123), the image processing apparatus 10 performs the processing in step S123 again. On the other hand, if determining that specification of a target object, such as specification of a position and a size of a target object in the image, has been received (YES in S123), the image processing apparatus 10 proceeds to step S13.

Step S121 need not be performed before step S122, but may be performed after step S123 (YES in S123), instead, and then step S13 may be performed. Details of the processing performed in steps S122 and S123 have already been described above and are not described again.

Next, the image processing apparatus 10 calculates a target location area, which includes the vanishing point calculated in step S11 and in which the target object can be located in the at least one of the plurality of images specified in step S12 (S13). More specifically, as illustrated in FIG. 19, the image processing apparatus 10 calculates a target location area on the basis of the vanishing point calculated in step S11 and the specification of a target object (coordinates of a target object) received in step S12 (S131) and applies the target location area to all the plurality of images (S132). In step S132, as described above, an area in each of the plurality of images located at the same position as the calculated target location area is applied as a target location area.

Next, the image processing apparatus 10 performs image processing in all the target location areas in the plurality of images calculated in step S13 (S14).

Advantageous Effects

As described above, according to the present embodiment, a method for processing an image by which image processing for protecting privacy is certainly performed can be achieved.

More specifically, since the plurality of images in the present embodiment are temporally successive images included in a moving image captured by a vehicle camera or equivalent images, each of the plurality of images includes a vanishing point at the same position (position coordinates). A target location area, in which a target object whose privacy is to be protected can be located in each of the plurality of images, can therefore be estimated in accordance with perspective on the basis of the vanishing point and coordinates of the target object in at least one of the plurality of images using an area obtained by connecting the vanishing point and the position of the target object. Since an area located at the same position as the calculated target location area can be calculated as a target location area in each of the plurality of the plurality of images, image processing for protecting privacy can be certainly performed on a target object by performing image processing in the target location area.

In other words, according to the present embodiment, since a position at which a target object, such as a person, appears in at least one image can be estimated in accordance with perspective by manually specifying an area indicating the target object, image processing for protecting privacy can be semi-automatically performed. As a result, images for crowdsourcing in which privacy is protected can be easily and certainly generated.

In the method for processing an image according to the present embodiment and the like, a person (specifier) needs to input information indicating a position and a size of a target object whose privacy is to be protected in at least one of a plurality of images. This, however, is less cumbersome than when the person needs to input information indicating positions and sizes of target objects to all the plurality of images.

In addition, if image processing for protecting privacy is performed by detecting a position and a size of a target object through image recognition, and if the target object is not detected (there is an error in detection), for example, privacy might not be protected. With the method for processing an image according to the present embodiment, on the other hand, image processing for protecting privacy can be certainly performed on a target object.

In addition, if image processing for protecting privacy is uniformly performed in all of a plurality of images, for example, it is difficult, as described above, for a worker employed through crowdsourcing to find small target objects (persons and the like) in images such as photographs and video frames. With the method for processing an image according to the present embodiment, on the other hand, privacy is protected in a plurality of images, and image processing, such as blurring, is not performed in the entirety of the plurality of images. As a result, for example, a worker employed through crowdsourcing can add tags without mistaking background colors similar to small target objects, such as persons, for the target objects, and does not mistake background objects and the like for target objects and add tags to the background objects. That is, with the method for processing an image according to the present embodiment, a worker employed through crowdsourcing can increase the accuracy of adding tags indicating positions and sizes of target objects.

Figure 20:
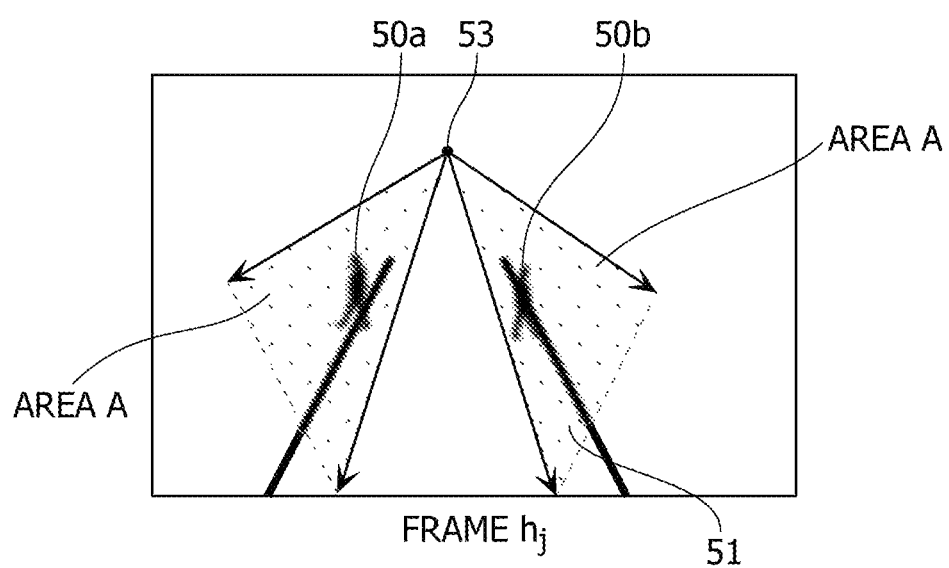
FIG. 20 is a diagram illustrating another example of the method for processing an image according to the embodiment.

Although a plurality of images each include a person in the present embodiment, the number of persons included in each image is not limited to this. The plurality of images may each include two or more persons as target objects. A case in which a plurality of images each include two persons as target objects will be described hereinafter with reference to FIG. 20. FIG. 20 is a diagram illustrating another example of the method for processing an image according to the present embodiment.

As indicated by a frame $h_j$ illustrated in FIG. 20, for example, the image processing apparatus 10 can perform the same image processing even when a plurality of images (e.g., frames $h_1$ to $h_n$) each include persons 50a and 50b. That is, the image processing apparatus 10 may receive specification of the persons 50a and 50b, calculate a target location area (area A) for each of the persons 50a and 50b, and perform image processing in the calculated target location area (area A).

Although a person and a sign are taken as examples of a target object in the present embodiment, the target object is not limited to these examples. The target object may be any kind of object whose privacy needs to be protected, such as a nameplate in front of a house or a license plate of a vehicle.

Although a method for processing an image according to one or a plurality of aspects of the present disclosure has been described above with reference to an embodiment, the present disclosure is not limited to this embodiment. The one or plurality of aspects of the present disclosure may include modes obtained by modifying the embodiment in various ways conceived by those skilled in the art, insofar as the scope of the present disclosure is not deviated from. For example, the present disclosure includes the following cases.

(1) The above-described apparatus is specifically a computer system including a microprocessor, a read-only memory (ROM), a random-access memory (RAM), a hard disk unit, a display unit, a keyboard, and a mouse. The RAM or the hard disk unit stores a computer program. When the microprocessor operates in accordance with the computer program, the apparatus achieves functions thereof. The computer program includes a plurality of command codes indicating instructions to a computer in order to achieve certain functions.

(2) Part or all of the components included in the above-described apparatus may be achieved by a single system large-scale integration (LSI) circuit. The system LSI circuit is a super-multifunctional LSI circuit fabricated by integrating a plurality of components on a single chip and is specifically a computer system including a microprocessor, a ROM, and a RAM. The RAM stores a computer program. When the microprocessor operates in accordance with the computer program, the system LSI circuit achieves functions thereof.

(3) Part or all of the components included in the above-described apparatus may be achieved by an integrated circuit (IC) card or a separate module removably attached to the apparatus. The IC card or the module is a computer system including a microprocessor, a ROM, and a RAM. The IC card or the module may include the above-described super-multifunctional LSI circuit. When the microprocessor operates in accordance with a computer program, the IC card or the module achieves functions thereof. The IC card or the module may be tamper-resistant.

(4) The present disclosure may be the above-described method. Alternatively, the present disclosure may be a computer program that achieves the method or may be a digital signal including the computer program.

(5) The present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray disc (BD; registered trademark), or a semiconductor memory. Alternatively, the present disclosure may be the digital signal stored in one of these recording media.

(6) The present disclosure may be the computer program or the digital signal transmitted through an electrical communication line, a wireless or wired communication line, a network typified by the Internet, datacasting, or the like.

(7) The present disclosure may be a computer system including a microprocessor and a memory. The memory may store the computer program, and the microprocessor may operate in accordance with the computer program.

(8) The present disclosure may be achieved by another independent computer system by recording the program or the digital signal on the recording medium and transporting the recording medium or by transmitting the program or the digital signal through the network.

The present disclosure can be applied to a method for processing an image and a program and more particularly to a method for processing an image and a program for protecting privacy of a person included in each of a plurality of images provided when a worker employed through crowdsourcing is requested to add tags (labeling).

What is claimed is:

1. A method for processing an image, the method comprising:
    calculating a vanishing point located at a same position in a plurality of images that are temporally successive;
    receiving specification of a target object whose privacy is to be protected in at least one of the plurality of images;
    calculating a target location area, which includes the vanishing point and in which the target object is located in each of the plurality of images, on the basis of the specification of the target object in the at least one of the plurality of images received in the receiving and the vanishing point calculated in the calculating the vanishing point; and
    performing image processing for protecting privacy in an area in each of the plurality of images located at a same position as the target location area calculated in the calculating the target location area.

2. The method according to claim 1,
    wherein the plurality of images each include the target object, and
    wherein a size of the target object increases or decreases in the plurality of images.

3. The method according to claim 1,
    wherein the plurality of images are included in a moving image captured by a vehicle camera.

4. The method according to claim 1,
    wherein the image processing is a mosaic process, blurring, or pixelization.

5. The method according to claim 1,
    wherein the calculating the vanishing point includes
    detecting feature points corresponding to a plurality of parts of the target object in each of at least two of the plurality of images,
    associating feature points on a first part of the target object included in the at least two of the plurality of images with each other and feature points on a second part of the target object included in the at least two of the plurality of images with each other, and
    calculating the vanishing point located at the same position in the plurality of images by calculating an intersection point between a first straight line connecting the associated feature points on the first part and a second straight line connecting the associated feature points on the second part.

6. The method according to claim 1,
    wherein, in the receiving, the specification of the target object is received by receiving specification of coordinates of the target object included in the at least one of the plurality of images.

7. The method according to claim 1,
    wherein, in the performing, different types of image processing are performed between a certain portion, including the vanishing point, of the area located at the same position in each of the plurality of images and a portion other than the certain portion.

8. The method according to claim 7,
    wherein the image processing is blurring, and
    wherein, in the performing, the image processing is performed such that a degree of the blurring in the portion other than the certain portion becomes higher than a degree of the blurring in the certain portion.

9. The method according to claim 1,
    wherein, in the performing, the image processing is performed in a portion of the area located at the same position in each of the plurality of images other than a certain portion including the vanishing point.

10. The method according to claim 1,
    wherein, in the performing, if the area located at the same position in each of the plurality of images includes a target object on which the image processing is not to be performed, the image processing is performed in a portion of the area located at the same position other than the target object.

11. The method according to claim 1,
    wherein, at least one of the calculating the vanishing point, the receiving the specification of a target object, calculating the target location area, and the performing the image processing is performed by a processor.

12. A computer-readable non-transitory recording medium storing a program for causing a computer to perform a process comprising:
    calculating a vanishing point located at a same position in a plurality of images that are temporally successive;
    receiving specification of a target object whose privacy is to be protected in at least one of the plurality of images;
    calculating a target location area, which includes the vanishing point and in which the target object is located in each of the plurality of images, on the basis of the specification of the target object in the at least one of the plurality of images received in the receiving and the vanishing point calculated in the calculating the vanishing point; and
    performing image processing for protecting privacy in an area in each of the plurality of images located at a same position as the target location area calculated in the calculating the target location area.

* * * * *